US012737316B2

(12) United States Patent
Mutter et al.

(10) Patent No.: US 12,737,316 B2
(45) Date of Patent: Sep. 15, 2026

(54) SUBSCRIBER STATION FOR A SERIAL BUS SYSTEM, AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 21 days.

(21) Appl. No.: 18/857,645

(22) PCT Filed: Jun. 13, 2023

(86) PCT No.: PCT/EP2023/065742

§ 371 (c)(1),
(2) Date: Oct. 17, 2024

(87) PCT Pub. No.: WO2024/027972

PCT Pub. Date: Feb. 8, 2024

(65) Prior Publication Data

US 2025/0258792 A1 Aug. 14, 2025

(30) Foreign Application Priority Data

Aug. 1, 2022 (DE) ..................... 10 2022 207 919.1

(51) Int. Cl.
*G06F 13/42* (2006.01)

(52) U.S. Cl.
CPC .. *G06F 13/4282* (2013.01); *G06F 2213/0012* (2013.01)

(58) Field of Classification Search
CPC ......... G06F 13/4282; G06F 2213/0012; H04L 12/40013; H04L 1/1607; H04L 12/413;
(Continued)

(56) References Cited

U.S. PATENT DOCUMENTS

| | | | | |
|---|---|---|---|---|
| 2007/0248226 A1* | 10/2007 | Chong | .............. | H04N 21/2383 375/E7.009 |
| 2020/0162361 A1* | 5/2020 | Rambo | .................. | H04L 43/50 |
| 2021/0120017 A1* | 4/2021 | Antonsson | ............ | G01R 27/16 |

FOREIGN PATENT DOCUMENTS

| | | |
|---|---|---|
| DE | 102012110712 A1 | 4/2014 |
| DE | 102012224234 A1 | 6/2014 |
| DE | 102018202168 A1 | 6/2019 |

OTHER PUBLICATIONS

DE-102012224234-A1, Jun. 26, 2014, DE, Molter Hans Gregor, (Year: 2014).*

(Continued)

*Primary Examiner* — Farley Abad
(74) *Attorney, Agent, or Firm* — NORTON ROSE FULBRIGHT US LLP

(57) ABSTRACT

A subscriber station for a serial bus system. The subscriber station has a communication control device for controlling a communication of the subscriber station with at least one other subscriber station of the bus system and for generating a transmit signal according to a frame; a receiving device configured to serially receive at least one signal from the bus; and a tamper check module for checking whether at least one predetermined field of a frame received from the at least one signal received from the bus has at least one pulse having a second bit value, which is inverse to the predetermined first bit value, in a received bit which has a predetermined first bit value and a predetermined duration.

17 Claims, 5 Drawing Sheets

(58) Field of Classification Search
CPC ......... H04L 63/123; H04L 2012/40215; H04L 2012/40273
See application file for complete search history.

(56) References Cited

OTHER PUBLICATIONS

International Search Report for PCT/EP2023/065742, Issued Sep. 18, 2023.
ISO 11898-1:2015 Standard, "Road Vehicles—Controller Area Network (CAN)—PART 1: Data Link Layer and Physical Signalling," 2015, pp. 1-74.
ISO11898-2:2016 Standard, "Road Vehicles—Controller Area Network (CAN)—PART 2: High-Speed Medium Access Unit," 2016, pp. 1-40.

* cited by examiner

Fig. 1

450
453
454
455
451
452
t
SOF
ID
ID 28
ID 27
ID 19
ID 18
RRS
IDE
FDF
res
BRS
ESI
DCL
BIT 3
BIT 2
BIT 1
BIT 0
Byte 0
BIT 7
BIT 6
BIT 1
BIT 0
Byte f(DLC)
BIT 7
BIT 6
BIT 1
BIT 0
456
457
458
SBC
SBC 3
SBC 2
SBC 1
SBC 0
CRC 21 or 17
BIT 20
BIT 19
BIT 1
BIT 0
CRC Delimiter
ACK Slot
ACK Delimiter
BIT 1
BIT 7

450
455
452
455(450_1_2)
450_1_1
451
DP
t_bt1
t_bt2
RxD
1
0
t
INT1
EOF bit 7
EOF bit 6
EOF bit 3
EOF bit 2
EOF bit 1
ACK Delimiter
ACK Slot
CRC Delimiter

Z1

Z2

SUBSCRIBER STATION FOR A SERIAL BUS SYSTEM, AND METHOD FOR COMMUNICATION IN A SERIAL BUS SYSTEM

FIELD

The present invention relates to a subscriber station for a serial bus system and to a method for communication in a serial bus system, which operate at a high data rate and with great flexibility and high error robustness. Unauthorized manipulation of the operation of a higher-level technical installation must be prevented.

BACKGROUND INFORMATION

Bus systems for communication between sensors and control units, for example in vehicles, should allow for the transmission of a large amount of data in order to be able to ensure the greatest possible number of functions of a technical installation or a vehicle. It is often required that the data be transmitted quickly from the transmitter to the receiver. In addition, it should also be possible to transmit large data packets if necessary.

Currently, many series vehicles already use a bus system in which data are exchanged as messages between bus subscribers and are encoded with CAN FD for transmission on the bus as a frame in the ISO11898-1:2015 standard as the CAN protocol specification. The messages are thus exchanged between the bus subscribers of the bus system, such as sensors, control units, encoders, etc., and are transmitted as a frame on the bus for this purpose. CAN FD is used by most manufacturers in the first step with a 2 Mbit/s data bit rate and a 500 kbit/s arbitration bit rate in the vehicle.

Alternatively, CAN XL can be used, which is a successor bus system to CAN FD. With CAN XL, even higher data rates are possible than with CAN FD. In addition, longer messages are possible than with CAN FD. CAN XL is thus, in particular, also suitable for applications in which other functions, such as functional safety, data security and quality of service (QoS), are supported in addition to pure data transport via the CAN bus. These are elementary properties which are required, for example, in an autonomously driving vehicle.

CAN XL and CAN ED as well as Classical CAN are compatible, with CAN XL having at least the error robustness that CAN FD and Classical CAN possess. In each of the CAN versions mentioned, the data field of a frame for a message to be sent via the bus can contain any values.

A problem can arise if a manipulator embeds a second valid CAN frame (attack frame) into the data field of a valid frame (carrier frame).

The problem here is that messages of different lengths, i.e., different numbers of bytes in the data field, can be sent in both CAN FD and CAN XL. A DLC field, which is placed before the data field in a message, therefore specifies the number of bytes of the data field. It is possible that, due to electromagnetic interference, a receiver sees a different value in one of the four bits of the DLC field in CAN FD frames than the value corresponding to the code for the actual length of the data field of the carrier frame, in particular in the most significant bit of the DLC field. If this error is not visible to the transmitter, the transmitter does not abort the transmission of the carrier frame. This can result in the receiver seeing and receiving two valid CAN frames instead of just one valid CAN frame, namely, a valid but truncated carrier frame and an attack frame.

This allows the receiver to be manipulated by the attack frame. In particular, the normal operation of the installation can be changed without authorization. This can lead to undesirable results and possibly to a safety risk for the higher-level technical installation.

SUMMARY

It is an object of the present invention to provide a subscriber station for a serial bus system and a method for communication in a serial bus system which solve the aforementioned problems. In particular, a subscriber station for a serial bus system and a method for communication in a serial bus system are to be provided which offer security against manipulation in order also to realize safe operation of the bus system and/or of the higher-level technical installation as well as a high error robustness in communication, even at a high data rate, with arbitrary values in the data field and an arbitrary amount of payload data per frame.

The object may be achieved by a subscriber station for a serial bus system having certain features of the present invention. According to an example embodiment of the present invention, the subscriber station has a communication control device for controlling a communication of the subscriber station with at least one other subscriber station of the bus system and for generating a transmit signal according to a frame, a receiving device, which is configured to serially receive at least one signal from the bus, and a tamper check module for checking whether at least one predetermined field of a frame which the receiving device created and thus received from the at least one signal received from the bus has at least one pulse having a second bit value, which is inverse to the predetermined first bit value, in a received bit which has a predetermined first bit value and a predetermined duration, wherein the tamper check module is also configured to discard the received frame after the at least one pulse is present which has the second bit value, which is inverse to the predetermined first bit value.

Due to its configuration, the subscriber station (node) described can check a frame received from the bus for tampering, even if the subscriber station is a receiving node and was therefore not the transmitter of the frame received by the bus. Depending on the result of the check, an appropriate response can be made; in particular, the frame can be discarded to prevent tampering with the subscriber station. In particular, no valid frame is erroneously decoded as two valid frames.

As a result, a subscriber station infected with malware cannot send frames in an undetected manner which disrupt the operation of the bus system or the higher-level installation and/or cause additional damage. Security in the bus system can thus be increased.

As a result, even if the amount of payload data per frame is increased, the subscriber station can also ensure transmission and reception of the frames with a high level of functional safety, with great flexibility as regards current events during operation of the bus system, and with a low error rate.

The method carried out by the subscriber station can also be used if at least one CAN subscriber station and/or at least one CAN FD subscriber station and/or at least one CAN XL subscriber station is also present in the bus system, which send messages according to the CAN protocol and/or the CAN FD protocol and/or CAN XL protocol.

Advantageous further embodiments of the subscriber station are disclosed herein.

The tamper check module can be configured to check the at least one predetermined field of the received frame in addition to comparing the received frame to a valid frame format for the bus system.

The tamper check module may be configured to discard the received frame after the number of the at least one pulse having the second bit value inverse to the predetermined first bit value has exceeded a predetermined upper limit.

For example, the tamper check module is configured to check whether, in a received recessive bit having a duration, at least one dominant pulse occurs which has a shorter duration than the received recessive bit.

In one example embodiment of the present invention, the tamper check module is configured to check whether, in a bit sequence of at least two received recessive bits each having a duration, at least one dominant pulse occurs which has a shorter duration than the received recessive bit.

It is possible that the tamper check module has a first counter for counting the number of falling edges which occur from the beginning of the predetermined field of the received frame to the end of the predetermined field of the received frame.

Optionally, the tamper check module has a second counter for counting the number of time quanta which have the inverse bit value and occur from the beginning of the predetermined field of the received frame to the end of the predetermined field of the received frame.

In one example embodiment of the present invention, the tamper check module has a second counter for counting the number of a predetermined number of consecutive time quanta which have the inverse bit value and occur from the beginning of the predetermined field of the received frame to the end of the predetermined field of the received frame.

The tamper check module may have a first evaluation block comprising the first counter and/or the second counter.

The first evaluation block can be a bit timing logic of the communication control device.

The tamper check module may have a second evaluation block for evaluating whether the frame is to be discarded or not, wherein the second evaluation block is configured to exchange signals with the first evaluation block for evaluating the predetermined field of the received frame.

The second evaluation block can be a bit stream processor of the communication control device.

The at least one predetermined field of the received frame can comprise at least one of the following fields or bits, namely, an acknowledgment delimiter bit (ACK delimiter) in an acknowledgment field of the received frame which follows an acknowledgment bit (ACK slot), an end field of the received frame, and an error delimiter of the error frame.

According to one option, the tamper check module is configured to check for dominant pulses in order to detect on the bus, in the case of integration into a communication on the bus, a predetermined idle condition having a predetermined number of bits of the same value, which number cannot otherwise occur in a communication on the bus.

According to an example embodiment of the present invention, the communication control device for serially generating the transmit signal for transmission to the bus is possibly configured in such a way that, for one frame, the bit time of the signal transmitted to the bus in a first communication phase can differ from a bit time of the signal transmitted in a second communication phase.

It is possible that, in a first communication phase, it is negotiated which of the subscriber stations of the bus system will be given an at least temporarily exclusive, collision-free access in a subsequent, second communication phase.

The subscriber station described above can be part of a bus system which additionally comprises a bus and at least two subscriber stations which are connected to one another via the bus in such a way that they can communicate in series with one another. At least one of the at least two subscriber stations is an above-described subscriber station.

The aforementioned object may also achieved by a method for communication in a serial bus system according to the present invention. According to an example embodiment of the present invention, the method is carried out with a subscriber station of the bus system which has a communication control device, a receiving device and a tamper check module, wherein the method comprises the steps of controlling, using the communication control device, a communication of the subscriber station with at least one other subscriber station of the bus system, wherein the communication control device is configured to generate a transmit signal according to a frame; serially receiving, using the receiving device, at least one signal from the bus of the bus system; checking, using the tamper check module, whether at least one predetermined field of a frame which the receiving device has created and thus received from the at least one signal received from the bus has at least one pulse having a second bit value, which is inverse to the predetermined first bit value, in a received bit which has a predetermined first bit value and a predetermined duration, wherein the tamper check module is also configured to discard the received frame after the at least one pulse is present which has the second bit value, which is inverse to the predetermined first bit value.

The method offers the same advantages as those mentioned above in relation to the subscriber station.

Further possible implementations of the present invention also include combinations, even those not explicitly mentioned, of features or embodiments described above or below with respect to the exemplary embodiments. In this case, a person skilled in the art will also add individual aspects as improvements or additions to the relevant basic form of the present invention.

BRIEF DESCRIPTION OF THE DRAWINGS

The present invention is described in more detail below with reference to the figures and on the basis of exemplary embodiments.

FIG. 1 shows a simplified block diagram of a bus system according to a first exemplary embodiment of the present invention.

In the figures, identical or functionally identical elements are given the same reference signs unless otherwise indicated.

DETAILED DESCRIPTION OF EXAMPLE EMBODIMENTS

Figure 1:
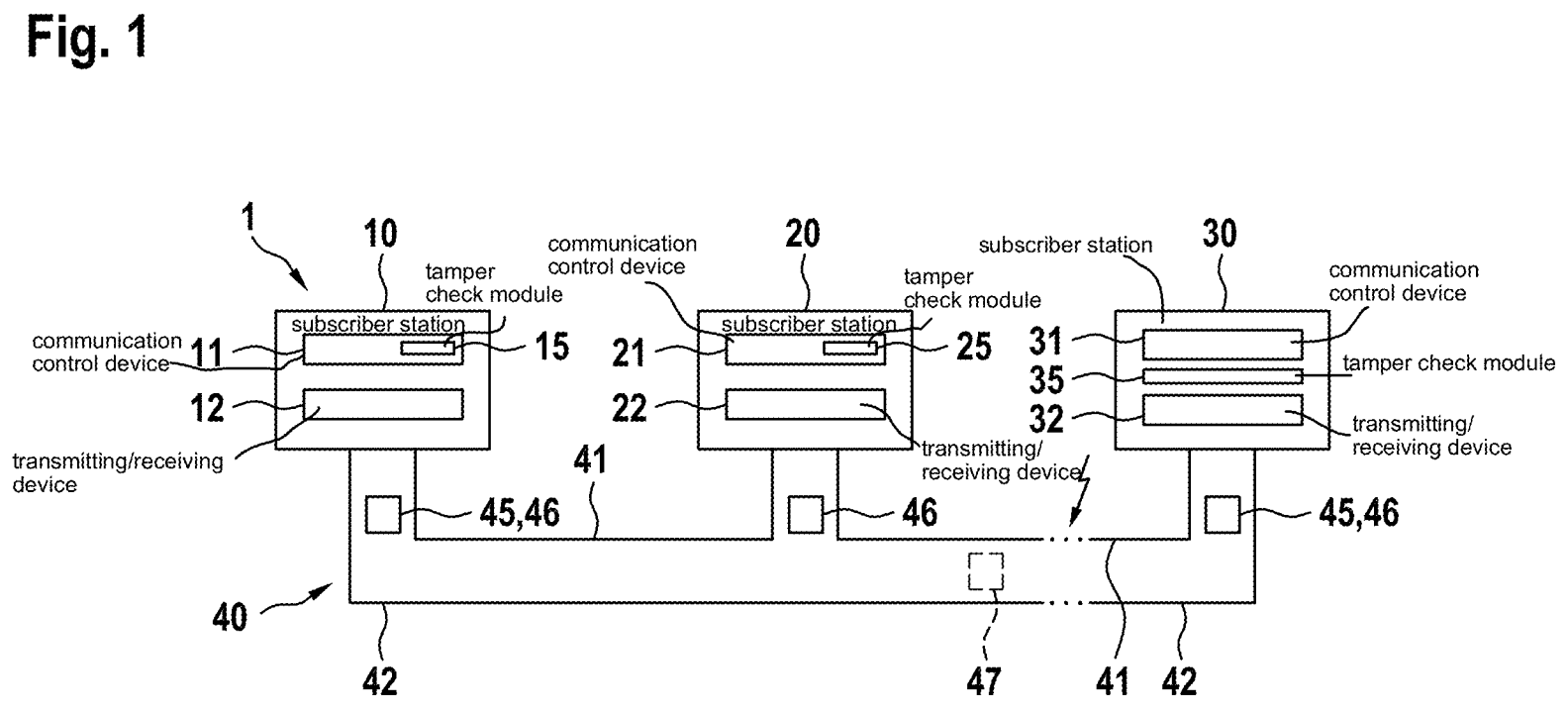
Figure 2:
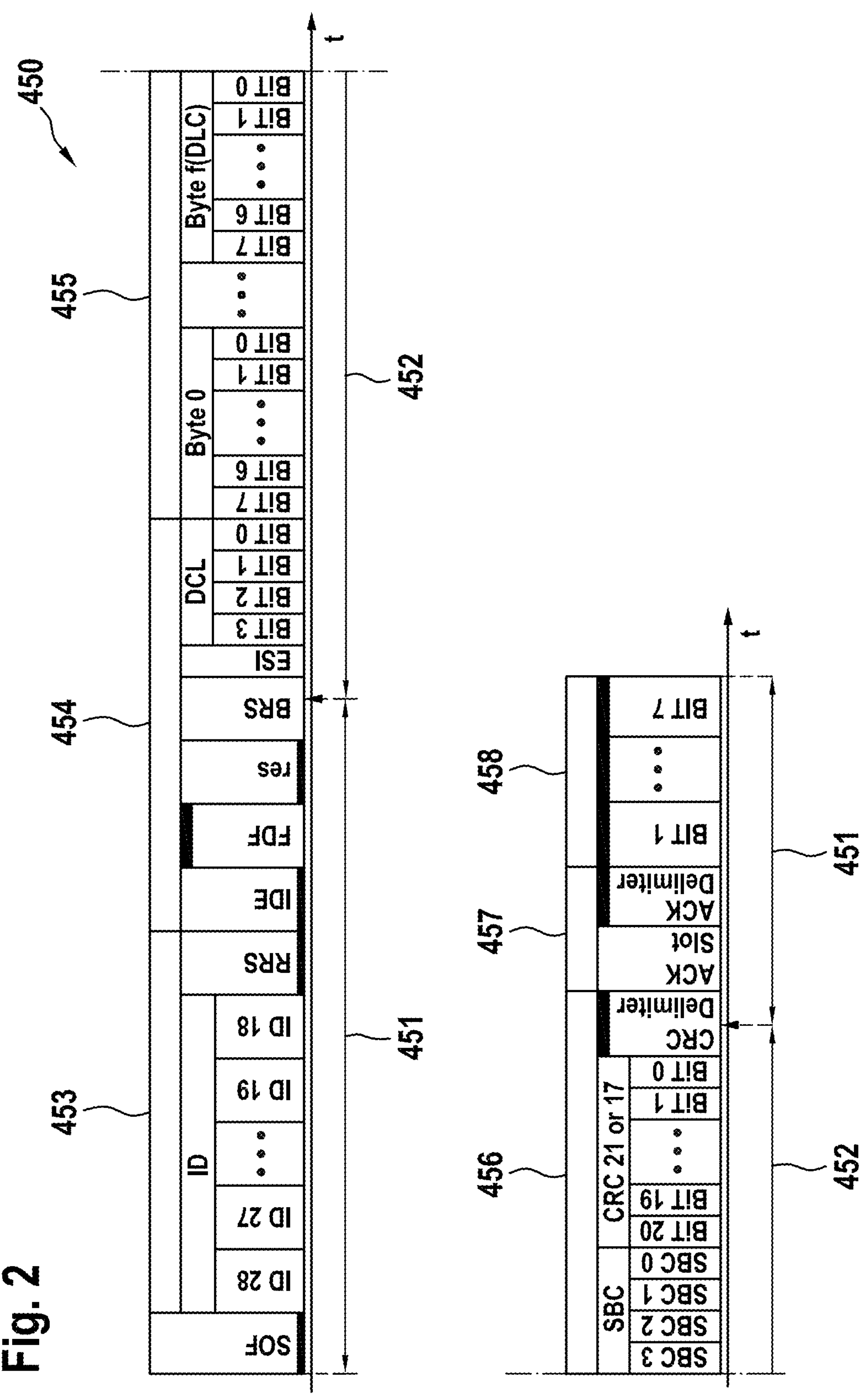
FIG. 2 shows a diagram for illustrating the structure of a message which can be transmitted by a subscriber station of the bus system according to the first exemplary embodiment of the present invention.

FIG. 1 shows an example of a bus system 1, which is in particular fundamentally designed for a CAN bus system, a CAN FD bus system, a CAN XL bus system, and/or modifications thereof, as described below. The bus system 1 can be used in a vehicle, in particular a motor vehicle, an aircraft, etc., or in a hospital, etc.

In FIG. 1, the bus system 1 has a plurality of subscriber stations 10, 20, 30, which are each connected to a bus 40 with a first bus wire 41 and a second bus wire 42. The bus wires 41, 42 can also be referred to as CAN_H and CAN_L or CAN-XL_H and CAN-XL_L and are used for electrical signal transmission after the coupling-in of the dominant levels or the generation of recessive levels or of other levels for a signal in the transmission state. Messages 45, 46 in the form of signals can be transmitted between the individual subscriber stations 10, 20, 30 in series via the bus 40. If an error occurs during the communication on the bus 40, as shown by the zig-zag black arrow in FIG. 1, an error frame 47 (error flag) can optionally be transmitted. The subscriber stations 10, 20, 30 are, for example, control units, sensors, display devices, etc. of a motor vehicle.

As shown in FIG. 1, the subscriber station 10 has a communication control device 11, a transmitting/receiving device 12 and a tamper check module 15. The subscriber station 20 has a communication control device 21 and a transmitting/receiving device 22 and optionally a tamper check module 25. The subscriber station 30 has a communication control device 31, a transmitting/receiving device 32 and a tamper check module 35. The transmitting/receiving devices 12, 22, 32 of the subscriber stations 10, 20, 30 are each directly connected to the bus 40, even if this is not shown in FIG. 1. Each of the transmitting/receiving devices 12, 22, 32 can optionally be configured as a separate transmitting device and as a separate receiving device.

The communication control devices 11, 21, 31 are each used for controlling a communication of the relevant subscriber station 10, 20, 30 via the bus 40 with at least one other subscriber station of the subscriber stations 10, 20, 30 which are connected to the bus 40.

The communication control devices 11, 31 create and read first messages 45, which are, for example, modified CAN messages 45. In this case, the modified CAN messages 45 are structured on the basis of a CAN FD format, which is described in more detail with regard to FIG. 2, and in which the relevant tamper check module 15, 35 is used. The communication control devices 11, 31 can also be designed to create and read other modified CAN messages 46, which are structured on the basis of CAN XL, for example. In this case, the modified CAN messages 46 are structured on the basis of a CAN XL format, which is a development of CAN FD and is compatible with CAN FD. In the case of the CAN FD messages 45, a number of 0 to 64 data bytes can be included, which are in addition transmitted at a significantly faster data rate than in the case of a Classical CAN message. In the case of the CAN XL messages 46, a number of 0 to in particular approximately 2 kbytes or any other value can be included, which are in addition transmitted at a significantly faster data rate than in the case of a CAN FD message 45.

The communication control devices 11, 31 are thus configured to provide or receive a CAN FD message 45 or a CAN XL message 46 to or from the transmitting/receiving device 12, 32 as required. The communication control devices 11, 31 thus create and read a first message 45 or second message 46, wherein the first and second messages 45, 46 differ in their data transmission standard, namely in this case CAN FD or CAN XL.

The communication control device 21 can be designed as a conventional CAN controller according to ISO 11898-1: 2015, i.e., as a CAN FD-tolerant Classical CAN controller or a CAN FD controller. The communication control device 21 creates and reads first messages 45, for example CAN FD messages 45. In particular, the communication control device 21 is designed as a conventional CAN FD controller.

The transmitting/receiving device 22 can be designed as a conventional CAN transceiver according to ISO 11898-1: 2015 or a CAN FD transceiver. The transmitting/receiving devices 12, 32 can be designed to receive messages 45 according to the CAN FD format or messages 46 according to the CAN XL format from the associated communication control device 11, 31 as required or provide said messages to said associated communication control device.

A formation and then a transmission of messages 46 with the CAN XL format and the reception of such messages 46 can be realized with the two subscriber stations 10, 30.

FIG. 2 shows a CAN FD frame 450 for the message 45, as encoded over time t and provided by the communication control device 11 to the transmitting/receiving device 12 for transmitting to the bus 40. In this case, the communication control device 11 creates the frame 450 in the present exemplary embodiment as compatible with Classical CAN and with successor versions of CAN FD, for example with CAN XL, as also illustrated in FIG. 2. The same applies analogously to the communication control device 31 and the transmitting/receiving device 32 of the subscriber station 30.

According to FIG. 2, the CAN FD frame 450 is divided for CAN communication on the bus 40 into different communication phases 451, 452, namely an arbitration phase 451 and a data phase 452. The frame 450 has an arbitration field 453, a control field 454, a data field 455, a checksum field 456 for a checksum CRC, an acknowledgment field 457 and an end field 458. The bit duration of bits of the arbitration phase 451 is longer than the bit duration of bits of the data phase 452. As with Classical CAN, the physical layer for the frame 450 is the same in the arbitration phase 451 and the data phase 452. The physical layer corresponds to the bit transmission layer or layer 1 of the conventional OSI model (Open Systems Interconnection Model).

The beginning of a frame 450 is indicated with a bit SOF (start of frame). Subsequently, for example, at least one of the subscriber stations 10, 30 sends an identifier (ID) in the arbitration field 453. Based thereon, in the arbitration phase 451, with the aid of the bits ID28 to bit18 of the identifier (ID) in the arbitration field 453, negotiation takes place bitwise between the subscriber stations 10, 20, 30 as to which subscriber station 10, 20, 30 currently wishes to transmit the message 45, 46 with the highest priority and will therefore receive exclusive access to the bus 40 of the bus system 1 for the near future for transmitting in the subsequent data phase 452. At the end of the arbitration field 453, an RRS bit is sent.

An important point during the phase 451 is that the conventional CSMA/CR method is used, which allows simultaneous access of the subscriber stations 10, 20, 30 to the bus 40 without the higher-priority message 45, 46 being destroyed. As a result, further bus subscriber stations 10, 20, 30 can be added relatively easily to the bus system 1, which is very advantageous.

The CSMA/CR method has the consequence that there must be so-called recessive states on the bus 40, which can be overwritten by other subscriber stations 10, 20, 30 with dominant states on the bus 40. In the recessive state, high-impedance conditions prevail at the individual subscriber station 10, 20, 30, which in combination with the parasites on the bus circuit results in longer time constants. This leads to a limitation of the maximum bit rate of the present-day CAN-FD physical layer (FD transceiver according to ISO11898-2:2016) at currently about 2 megabits per second in real vehicle use. CAN XL can increase this maximum bit rate even further by, in particular additional, switching of the physical layer for the data phase 452.

In the data phase 452, in addition to a portion of the control field 454, the payload data of the CAN FD frame 450 or of the message 45 from the data field 455 as well as almost the entire checksum field 456 are transmitted for the frame of FIG. 2. The control field 454 has the control bits IDE, FDF, res, BRS, ESI and, in a DLC field, the 4 bits bit 3 to bit 0. The checksum field 456 has an SBC field and a field for the checksum CRC and the CRC delimiter bit.

A transmitter of the message 45 begins to transmit bits of the data phase 452 to the bus 40 only when the subscriber station 10 as the transmitter has won the arbitration and the subscriber station 10 as transmitter thus has exclusive access to the bus 40 of the bus system 1 for transmitting.

Very generally speaking, the following different properties can be implemented in the bus system with CAN XL in comparison with CAN or CAN FD:

- a) adopting and optionally adapting proven properties which are responsible for the robustness and user friendliness of CAN and CAN FD, in particular frame structure with identifier and arbitration according to the CSMA/CR method,
- b) increasing the net data transmission rate, in particular to about 10 megabits per second,
- c) increasing the size of the payload data per frame, in particular to about 2 kbyte or any other value.

As shown in FIG. 2, in the arbitration phase 451, the subscriber station 10 uses as the first communication phase partially, in particular up to the FDF bit (inclusive), a format from CAN/CAN FD according to ISO 11898-1:2015. For a CAN XL message 46, the subscriber station 10 uses a CAN XL format from the FDF bit in the first communication phase as well as in the second communication phase, the data phase 452.

In the present exemplary embodiment, CAN XL and CAN FD are compatible. For CAN XL, the res bit from CAN FD according to FIG. 2, which is also referred to as the XLF bit in the case of CAN XL, is used for switching from the CAN FD format to the CAN XL format. For this reason, the frame formats of CAN FD and CAN XL are identical up to the res bit or XLF bit. Only at the res bit or XLF bit can a receiver identify the format in which the frame 450 is transmitted. A CAN XL subscriber station, that is to say in this case the subscriber stations 10, 30, also supports CAN FD.

Alternatively to the frame 450 shown in FIG. 2, in which an identifier with 11 bits (bit ID28 to bit ID18) is used according to the CAN FD base frame format, an extended frame format is optionally possible for CAN FD or CAN XL, in which an identifier with 29 bits is used. Up until the FDF bit, this is identical to the CAN FD extended frame format from ISO11898-1:2015.

In the frame 450 according to FIG. 2, bits that have a fixed value, namely, 0 or 1, are marked with a thick black line. Bits shown with a thick line on their lower line in FIG. 2 are transmitted in the frame 450 as dominant or '0.' Bits shown with a thick line on their upper line in FIG. 2 are transmitted in the frame 450 as recessive or '1.' In the CAN XL data phase 452, when a special CAN SIC XL transceiver is used, symmetrical '1' and '0' levels can be used instead of recessive and dominant levels.

In general, two different stuffing rules are applied in the generation of a CAN XL frame. Up until the res bit in the control field 454, the dynamic bit stuffing rule of CAN FD applies so that an inverse stuff bit is to be inserted after 5 identical bits in succession. Such stuff bits are also referred to as dynamic stuff bits. After the res bit in the control field 454, a fixed stuffing rule applies in the case of CAN XL frames so that a fixed stuff bit is to be inserted after a fixed number of bits. Alternatively, instead of only one stuff bit, a number of 2 or more bits can be inserted as fixed stuff bits.

In the frame 450 of FIG. 2, the res bit, which corresponds in position to an "XLF bit" in the CAN XL format, follows directly after the FDF bit, as mentioned above. If the res bit is transmitted as 1, i.e., recessively, it thereby identifies the frame 450 as a CAN XL frame. For a CAN FD frame, the communication control device 11 sets the res bit as 0, i.e., dominant.

The res bit is followed in the frame 450 by the BRS bit, in which the bit duration for the arbitration phase 451 is switched to the bit duration for the data phase 452.

The BRS bit is followed by a DLC field, into which the data length code (DLC) is inserted, which indicates the number of bytes in the data field 455 of the frame 450. The data length code (DLC) can assume any value from 0 to the maximum length of the data field 455 or data field length. Since the maximum data field length for CAN FD is 64 bytes, the data length code (DLC) has a number of 4 bits, namely, the bits bit 3 to bit 0. In this case, DLC=0 means a data field length with a number of 0 bytes and DLC=15 means a data field length with a number of 64 bytes of data field length. This is to ensure that the receivers of the frame 450 receive the payload data correctly and reliably detect the end of the frame 450 with the fields 456, 457, 458. In addition, the bus 40 is to be released as quickly as possible to transmit other frames 450 or messages 45, 46 in order to maximize the data rate in the bus system 1. A frame 450 therefore does not block the bus 40 any longer than necessary.

In the frame 450 of FIG. 2, the DLC field is followed by the data field 455. The data field 455 consists of 0 to 64 data bytes. The length of the data field 455 is encoded in the DLC field as described above.

In the frame 450, the data field 455 is followed by an SBC field with bits SBC3 to SBC0 and then a checksum CRC. The checksum CRC is a CRC21 or CRC17 and therefore consists of bit 20 to bit 0 or bit 16 to bit 0 for the checksum CRC. The length of the checksum CRC and thus of the CRC polynomial must be selected according to the Hamming distance desired. The checksum CRC protects the entire frame 450. With a bit CRC delimiter of the checksum field 456 or starting with a bit CRC delimiter of said checksum field, the duration of the bits of the frame 450 is switched from the duration for the data phase 452 to the duration for the arbitration phase 451, in other words from short to long, as illustrated in FIG. 2.

In the frame 450, the CRC delimiter bit and thus the checksum field 456 are followed by the acknowledgment field 457, which has an ACK slot bit for acknowledging correct reception of the frame 450. The receiving subscriber stations 10, 30 transmit the ACK slot bit as dominant if they have received the frame 450 correctly. The transmitting subscriber station transmits the ACK slot bit as recessive. For this reason, the bit originally transmitted to the bus 40 in the frame 450 can be overwritten by the receiving subscriber stations 10, 30. The ACK delimiter bit is transmitted as a recessive bit, which is used for separation from other fields.

In the frame 450, the confirmation field (ACK field) 457 is followed by an end field 458 (EOF=end of frame). The bit sequence bit 1 to bit 7 of the end field 458 (EOF) is used to mark the end of the frame 450. The end field (EOF), together with the ACK delimiter bit, ensures that a number of 8 recessive bits is transmitted at the end of the frame 450. This is a bit sequence that cannot occur within the frame 450. As a result, the end of the frame 450 can be reliably detected by the subscriber stations 10, 20, 30.

Figures 7, 8, 9:
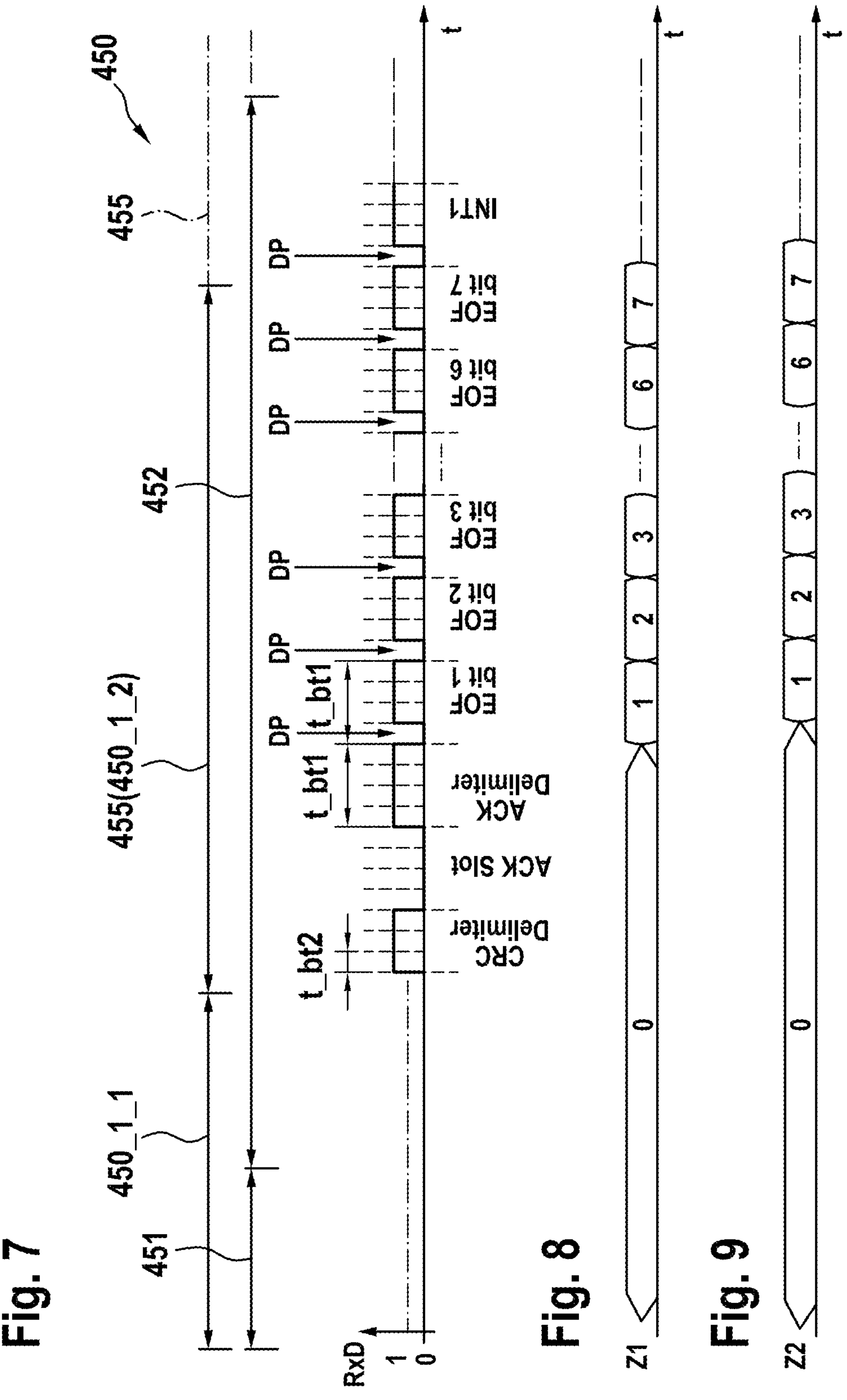
FIG. 7 shows an example of a part of a receive signal RxD, which the subscriber station of the bus system according to the first exemplary embodiment generates over time from the signals of a frame that are received from the bus.
FIG. 8 shows a time curve of a count value Z1, which results from a first counter of the subscriber station according to the first exemplary embodiment of the present invention due to the receive signal of FIG. 7.
FIG. 9 shows a time curve of a count value Z2, which results from a second counter of the subscriber station according to the first exemplary embodiment due to the receive signal of FIG. 7.

In the frame 450, the end field (EOF) is followed by an interframe spacing INT (intermission field), which is not shown in FIG. 2, but only in FIG. 8. The interframe spacing (INT) has a minimum of 3 bits in the case of CAN. In the case of CAN XL, this interframe spacing INT is also configured as in CAN FD according to ISO11898-1:2015.

Figure 3:
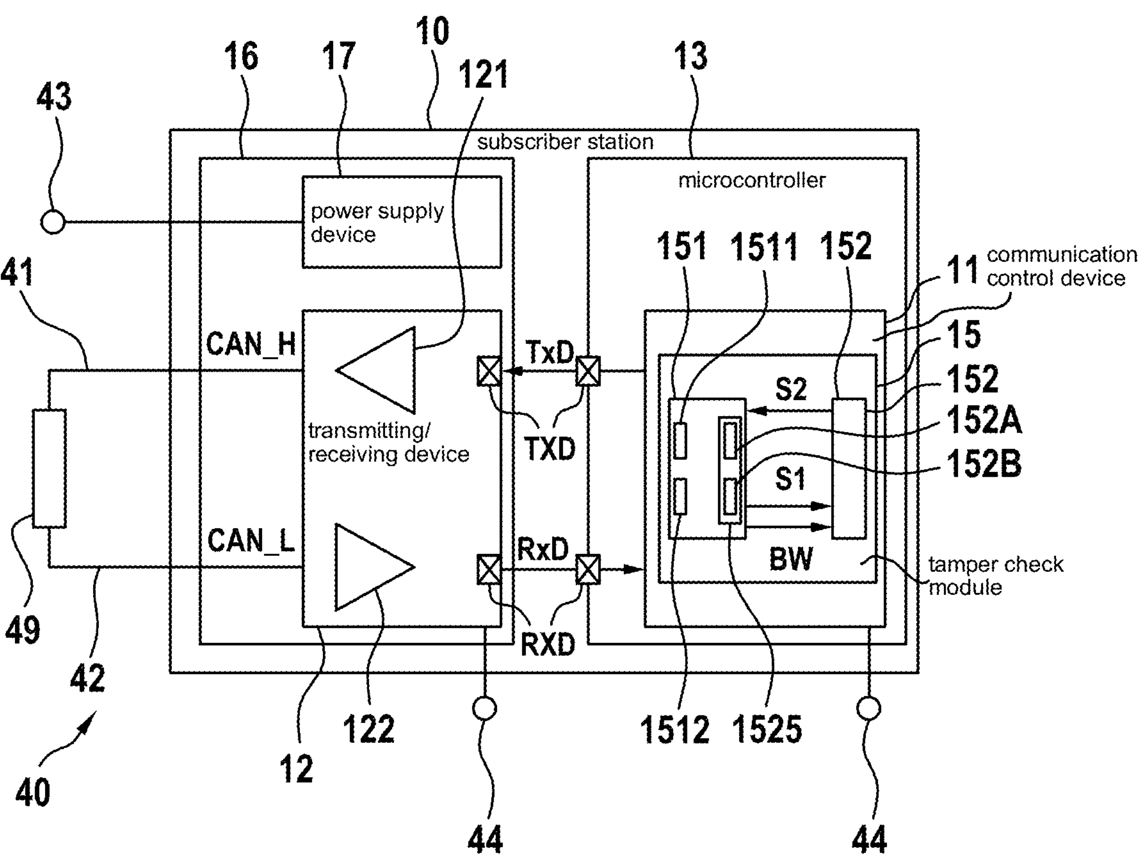
FIG. 3 shows a simplified schematic block diagram of a subscriber station of the bus system according to the first exemplary embodiment of the present invention.

FIG. 3 shows the basic structure of the subscriber station 10 with the communication control device 11, the transmitting/receiving device 12 and the tamper check module 15, which is part of the communication control device 11 in the subscriber station 10. The subscriber station 30 has a similar structure, as shown in FIG. 3, but the tamper check module 35 according to FIG. 1 is arranged separately from the communication control device 31 and the transmitting/receiving device 32. For this reason, the subscriber station 30 is not described separately.

According to FIG. 3, the subscriber station 10 has, in addition to the communication control device 11 and the transmitting/receiving device 12, a microcontroller 13 to which the communication control device 11 is assigned, and a system ASIC 16 (ASIC=application-specific integrated circuit), which can alternatively be a system basis chip (SBC) on which a plurality of functions necessary for an electronics module of the subscriber station 10 are combined. In the system ASIC 16, a power supply device 17 which supplies the transmitting/receiving device 12 with electrical energy is installed in addition to the transmitting/receiving device 12. The power supply device 17 usually supplies a voltage CAN Supply of 5 V. Depending on requirements, however, the power supply device 17 can provide a different voltage with a different value. Additionally or alternatively, the power supply device 17 can be designed as a current source.

Between the communication control device 11 and the transmitting/receiving device 12, the transmit signal TxD is exchanged via the relevant TXD terminal and the receive signal RxD is exchanged via RXD terminals, as described above and below.

The tamper check module 15 of FIG. 3 has a first evaluation block 151 and a second evaluation block 152. The first evaluation block 151 has a first counter 1511 and a second counter 1512. The second evaluation block 152 has a configuration register 1525.

Figure 6:
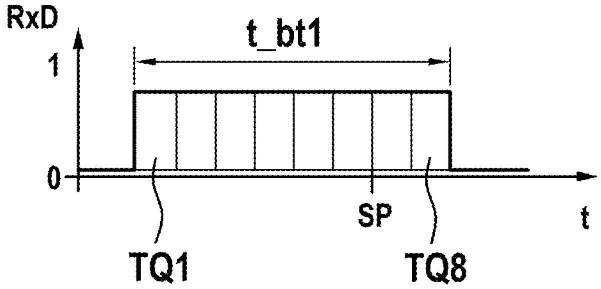
FIG. 6 shows the division of a bit into time quanta of a frame created by the subscriber station according to the first exemplary embodiment of the present invention, which frame is transmitted with the bus signals of FIG. 4 via the bus of the bus system.

The first evaluation block 151 generates sampling points SP (FIG. 6) for the signals CAN_H, CAN_L received from the bus 40 and outputs an associated signal S1 to the second evaluation block 152. In addition, the first evaluation block 151 ascertains the bit value BW for the receive signal RxD and outputs it to the second evaluation block 152. The bit value BW is 0 or 1. The first evaluation block 151 can be the bit timing logic (BTL) of the communication control device 11 or a part thereof. The bit timing logic (BTL) is a state machine which is evaluated once per time quantum and synchronizes to the bit stream at the RXD terminal of the device 11. FIG. 6 shows a bit which, by way of example, consists of 8 time quanta TQ1 to TQ8. In addition, the bit timing logic (BTL) generates the sampling point SP. The register 1525 stores parameters 152A, 152B, which the first evaluation block 151 uses for its evaluation, as described below.

The second evaluation block 152 outputs a signal S2 to the first evaluation block 151. The second evaluation block 152 can be the bit stream processor (BSP) of the communication control device 11 or a part thereof. The bit stream processor (BSP) is a state machine which is evaluated once per CAN bit time, i.e., either during the bit duration t_bt1 in the arbitration phase 451 or the bit duration t_bt2 in the data phase 452. The bit stream processor (BSP) encodes and/or decodes the CAN bit stream at the TXD, RXD terminals according to the rules of the CAN protocol.

The second evaluation block 152, in particular the bit stream processor (BSP), signals the first evaluation block 151, in particular the bit timing logic (BTL), with the signal S2 that the first evaluation block 151 should now additionally evaluate the receive signal RxD. The signal S2 can also be referred to as the "additional field to be evaluated" signal. As soon as the signal S2 ("additional field to be evaluated") is deactivated, the first evaluation block 151 resets the counters 1511, 1512, in particular their count values to 0.

The function of the tamper check module 15 is described in more detail below.

The transmitting/receiving device 12 also has a transmitting module 121 and a receiving module 122. Although reference is always made to the transmitting/receiving device 12 below, it is alternatively possible to provide the receiving module 122 in a separate device externally from the transmitting module 121. The transmitting module 121 and the receiving module 122 can be constructed as in a conventional transmitting/receiving device 22. The transmitting module 121 can in particular have at least one operational amplifier and/or a transistor. The receiving module 122 can in particular have at least one operational amplifier and/or a transistor.

The transmitting/receiving device 12 is connected to the bus 40, put more precisely the first bus wire 41 thereof for CAN_H or CAN-XL_H and the second bus wire 42 thereof for CAN_L or CAN-XL_L. The voltage supply for the power supply device 17 for supplying the first and second bus wires 41, 42 with electrical energy, in particular with the voltage CAN-Supply, is effected via at least one terminal 43. The connection to ground or CAN_GND is realized via a terminal 44. The first and second bus wires 41, 42 are terminated with a terminating resistor 49.

In the transmitting/receiving device 12, the first and second bus wires 41, 42 are not only connected to the transmitting module 121, which is also referred to as a transmitter, but also to the receiving module 122, which is also referred to as a receiver, although the connections are not shown in FIG. 3 for the sake of simplicity.

Figure 4:
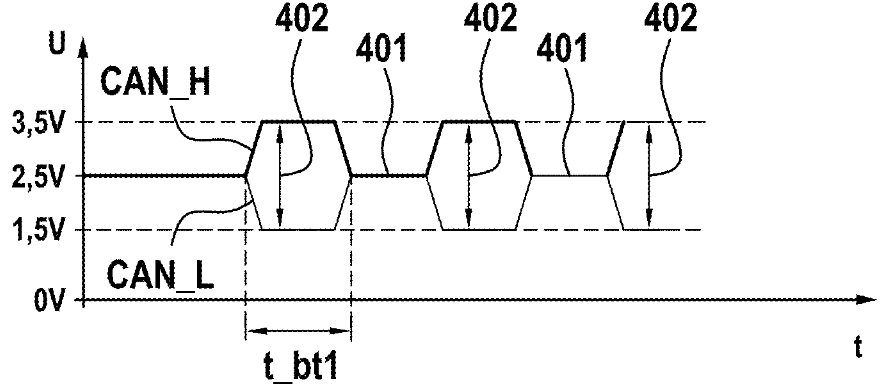
FIG. 4 shows a time curve of bus signals CAN_H and CAN_L at the subscriber station according to the first exemplary embodiment of the present invention.

During operation of the bus system 1, the transmitting module 121 converts a transmit signal TxD of the communication control device 11 into corresponding signals CAN_H and CAN_L for the bus wires 41, 42 and transmits these signals to the bus 40 at the terminals for CAN_H and CAN_L. An example of the signals CAN_H and CAN_L is shown in FIG. 4. A difference signal VDIFF=CAN_H−CAN_L, which is shown in FIG. 5, is formed on the bus 40.

Figure 5:
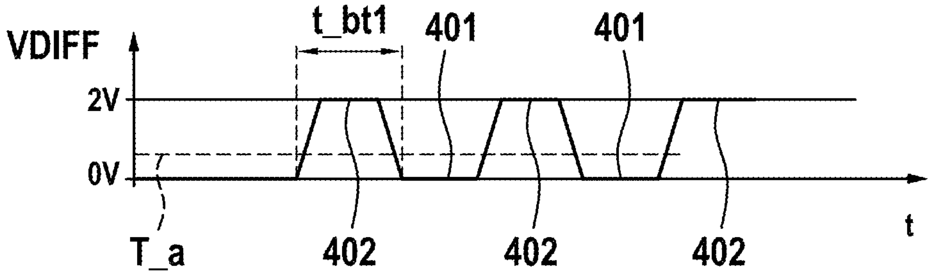
FIG. 5 shows a time curve of a differential voltage VDIFF of the bus signals CAN-XL_H and CAN-XL_L in the case of the subscriber station according to the first exemplary embodiment of the present invention.

The receiving module 122 of FIG. 3 forms a receive signal RxD from signals CAN_H and CAN_L received from the bus 40 according to FIG. 4 or from the difference signal VDIFF according to FIG. 5. As shown in FIG. 3, the receiving module 122 forwards the receive signal RxD via the RXD terminal of the transmitting/receiving device 12 to the RXD terminal of the communication control device 11.

With the exception of an idle or standby state, in normal operation, the transmitting/receiving device 12 constantly uses the receiving module 122 to listen for a transmission of data or messages 45, 46 on the bus 40, regardless of whether or not the transmitting/receiving device 12 is the transmitter of the message 45 or of a message 46.

According to the example of FIG. 4, the signals CAN_H and CAN_L have, at least in the arbitration phase 451, the dominant and recessive bus levels 401, 402, as from CAN. The individual bits of the signal VDIFF with the bit time t_bt1 can be detected with the receiving module 122 with a reception threshold T a of, for example, 0.7 V in the arbitration phase 451, as shown in FIG. 5. In the data phase 452, the bits of the signals CAN_H and CAN_L are sent faster, i.e., with a shorter bit time t_bt2 (FIG. 7), than in the arbitration phase 451, as already explained with reference to FIG. 2. The signals CAN_H and CAN_L of FIG. 4 thus differ in the data phase 452 from the conventional signals CAN_H and CAN_L of the arbitration phase 451 in terms of their faster bit rate. If the signals CAN_H and CAN_L in CAN XL are also generated in the data phase 452 with a different physical layer, the reception threshold will be switched in the receiving module 122 as well, for example to a reception threshold T d of approximately 0.0 V in the data phase 452.

The sequence of states 401, 402 for the signals CAN_H, CAN_L in FIG. 4 and the resulting curve of the voltage VDIFF of FIG. 5 serves only to illustrate the function of the subscriber station 10. The sequence of the data states for the bus states 401, 402 can be selected as required.

In other words, in a first mode of operation according to FIG. 4, the transmitting module 121 of FIG. 3 generates a first data state as a bus state 402 with different bus levels for two bus wires 41, 42 of the bus line and a second data state as a bus state 401 with the same bus level for the two bus wires 41, 42 of the bus line of the bus 40. In addition, for the time curves of the signals CAN_H, CAN_L, the transmitting module 121 of FIG. 3 transmits the bits at a higher bit rate to the bus 40 in a second mode of operation, which comprises the data phase 452. As mentioned, the signals for a CAN XL message 46 in the data phase 452 can also be generated with a different physical layer than in the case of CAN FD. As a result, the bit rate in the data phase 452 can be increased even further than in the case of CAN FD.

The tamper check module 15 of FIG. 3, in particular its evaluation block 151, is used to evaluate whether dominant pulses occur in the frame 450 currently being received. The tamper check is helpful to detect and prevent a specific attack. During the attack, a subscriber station infected with malware, for example the subscriber station 30, sends a message 45 with a specially selected content in the data field 452. If only one receiving node, for example the subscriber station 10, sees a bit error in the DLC field of the frame 450, in particular in bit 3 of the DLC field, the receiving node can be tricked into believing that the frame 450 has a shorter frame length than the frame 450 actually has. The tamper check module 15 of FIG. 3 is in particular necessary when a frame 450 is received, in order to detect a tampered frame 450.

For the evaluation, the tamper check module 15 proceeds as explained below with reference to FIG. 6 to FIG. 9.

FIG. 6 shows a division into time quanta TQ1 to TQ8 for a bit of a receive signal RxD generated by a subscriber station 10, 20, 30, as used by the associated communication control device 11, 21, 31. A time quantum TQ1, . . . , TQ8 corresponds to a time unit in which the communication control device 11, 21, 31 samples the receive signal RxD. For the sake of clarity, not all time quanta TQ2 to TQ7, which are arranged over time t between the time quanta TQ1 and TQ8, are provided with a reference sign in FIG. 6. For evaluating the bit value 1 or 0, the bit is sampled at a sampling point SP, which is usually located at about 75% of the bit duration t_bt1. For the bit in FIG. 6, a bit value “1” is sampled. The position of the sampling point SP in a bit can be configured as one of the parameters 152A, 152B in the register 1525 and stored in the register 1525.

The bit of FIG. 6 is, for example, a bit with the bit duration t_bt1, which is used in the arbitration phase 451. The number of time quanta TQ1, . . . , TQ8 is determined by the first evaluation block 151. In particular, the number of time quanta TQ1, . . . , TQ8 in a bit is freely selectable within the limits of the specifications of the CAN standard. In other words, the division into time quanta, for example the time quanta TQ1, . . . , TQ8, is carried out by the first evaluation block 151. The number of time quanta TQ1, . . . , TQ8 in a bit can be configured as one of the parameters 152A, 152B and stored in the register 1525.

The same as described with respect to FIG. 6 for a bit of the arbitration phase 451 applies to bits of the data phase 452, which have the bit duration t_bt2, even if this is not explicitly shown in the figures. The bit duration t_bt1, t_bt2 can be configured as one of the parameters 152A, 152B and stored in the register 1525.

FIG. 7 shows, for a frame 450, a part of a receive signal RxD which the communication control device 11 generates from the signals CAN_H, CAN_L or VDIFF received from the bus 40. FIG. 7 shows the receive signal RxD or RxD signal for the data field 455 of a frame 450 with special content, which can be used for a security attack. In this data field, a premature end of the frame 450 is forged. FIG. 7 shows the end forged with the help of bits of the second communication phase 452, more precisely, starting from the CRC delimiter bit at the end of the data field 455.

FIG. 7 shows the result of an evaluation of a frame 450 (carrier frame) that is currently being received. The frame 450 is initially evaluated as a first frame 450_1 with a front part 450_1_1 and an end part 450_1_2, although the data field 455 for the frame 450 (carrier frame) that is currently being received is actually still being sent via the bus 40. The reason for the prematurely expected end of the frame 450 is a bit error in a bit of the DLC field, which will be described in more detail later. This means that the communication control device 11 first receives, from the data field 455, the ACK (ACK slot) bit and the end field 458 (EOF) in the actual data field 455 of the frame 450 (carrier frame) that is currently being received, and evaluates this as the end part 450_1_2 of the frame 450 (carrier frame) that is currently being received.

The reason for the prematurely expected end is that the receiving communication control device 11 has seen a bit error in the DLC field, in particular in bit 3 of the DLC field, so that, for example, the DLC field of the frame 450 (carrier frame) that is currently being received has a value of 0xF before being falsified by the bit error, which, due to the bit error, announces a data field 455 with a length of 7 bytes (DLC field=0x7), although the frame 450 (carrier frame) that is currently being received actually has a data field 455 with a length of 64 bytes. This means that the communication control device 11 mistakenly expects a data field 455 with only 7 bytes. In addition, the frame 450 (carrier frame) that is currently being received according to FIG. 7 contains, starting from the 8th byte in the data field 455, a bit sequence which corresponds to a valid checksum CRC, followed by an emulated ACK field 457 with the ACK slot and ACK delimiter bits, an emulated end field 458 with the EOF bits 1 to 7 (cf. FIG. 2), an emulated interframe spacing (INT1, intermission) and an emulated bit sequence for the arbitration phase 451 of a subsequent frame 450.

Due to the dynamic CAN bit stuffing mechanism, the frame 450 (carrier frame) that is currently being received cannot represent sufficiently long recessive levels or bit values in the CAN FD data field 455 in order to accurately emulate, for example, the 8 recessive bits of ACK delimiter and the EOF field 458. Since the value of a bit depends only on the value of the signal RxD at the sample point, the communication control device 11 is able to filter out short dominant pulses DP in the signals CAN_H, CAN_L or VDIFF received from the bus 40.

Generally, the receiving module 122 can have, in a received bit having a predetermined first bit value and a predetermined duration t_bt1, t_bt2, at least one pulse having a second bit value inverse to the predetermined first bit value.

With the aid of the module 15, in particular the counters 1511, 1512, whose count values Z1, Z2 are shown in FIG. 8 and FIG. 9 for the frame 450 of FIG. 7, the occurrence of the dominant pulses DP in a recessive bit or of recessive pulses in a dominant bit can be detected. In this case, both the first counter 1511, which can also be called a "falling edge" counter, and the second counter 1512, which can also be called a "dominant time quanta" counter, can detect the dominant pulses DP and thus count them.

For example, the device 11, in particular the tamper check module 15, uses the first counter 1511 to count the number of falling edges of the RxD signal, i.e., a change of the RxD signal from the bit value 1 (recessive) to the bit value 0 (dominant) and/or the number of time quanta TQ seen as bit value 0 (dominant) in the RxD signal.

If the first evaluation block 151, in particular the bit timing logic (BTL), detects the number of falling edges or dominant pulses DP which is configured as an upper limit N for the number of falling edges or dominant pulses DP, the block 151 reports a dominant received bit (bit value 0) to the second evaluation block 152 at the next sampling point SP (FIG. 6), regardless of what the first evaluation block 151 actually sampled at the sampling point SP (FIG. 6). In this case, the second evaluation block 152 sees a format error for the frame 450 that is currently being received. The upper limit N for the number of falling edges or dominant pulses DP can be configured in one of the parameters 152A, 152B and stored in the register 1525.

In other words, if the number of edges and/or the number of time quanta TQ seen as bit value 0 (dominant) in the RxD signal exceeds a previously selected limit value, the device 11, in particular the tamper check module 15, treats this as a format error. Due to the format error, the frame 450 that is currently being received is evaluated or classified as invalid for the subscriber station 10 (receiver). Consequently, the subscriber station 10 (receiver) discards the frame 450.

For a counter reading or count value Z1 of, for example, N=2 of the counter 1511, as shown in FIG. 8, the end field 458 (EOF) can be classified as invalid (format error). As a result, in the example of FIG. 7 to FIG. 9, reception would be aborted and the subscriber station 10 (receiving node) would not receive a subsequent second frame (attack CAN frame). Instead, the subscriber station 10 (receiving node) starts an error frame 47.

The attack by the frame 450 (carrier frame with integrated second frame) that is currently being received is thus prevented.

The device 11, in particular the tamper check module 15, evaluates at least one predetermined field or bit, in particular the ACK delimiter bit and/or the field 458 (EOF) and/or the error delimiter field (which is part of an error frame 47) for a received CAN frame 450 using the evaluation block 1511 and at least one of the counters 1511, 1512. The predetermined field or bit can be configured as one of the parameters 152A, 152B and stored in the register 1525.

For example, the device 11, in particular the tamper check module 15, can proceed as follows. If the first evaluation block 151 detects a synchronization edge, which corresponds to a falling edge of the RxD signal, in one of the aforementioned fields of the CAN frame 450 to be evaluated, the block 151 reports this to the second evaluation block 152 at the next sampling point SP (FIG. 6) via the signals S1, BW as a dominant sampled bit.

The second evaluation block 152 uses the signals S1, BW to compare the CAN format of the frame according to FIG. 2 and thereby detects a format error in the frame 450 that is currently being received.

In this way, a bit error in one of the bits of the DLC field of the frame 450 can be reliably detected in the event of an embedded-frame attack. This makes it possible to prevent, in a very simple manner, in particular a manipulation in which a valid frame 450 (carrier frame) contains another valid frame 450, but the receiving subscriber station detects two valid frames 450 instead of just one frame 450 (carrier frame).

According to a second exemplary embodiment, the device 11, in particular the tamper check module 15, proceeds as follows. For example, at least one counter 1511, 1512 of the first evaluation block 151 counts sequences of N consecutive time quanta TQ instead of individual time quanta TQ. With N, the resolution can thus be set, i.e., from which width of a dominant pulse DP a counter 1511, 1512 counts. In this case, N is any natural number. In particular, in a specific example, N can be a number between 1 and 500.

In particular, N=3 is chosen so that, for example, the count value Z1 of the counter 1511 is only changed, in particular incremented or decremented, when 3 time quanta TQ with a dominant bit value occur one after the other.

In the second exemplary embodiment, the robustness against short dominant pulses DP can be maintained. Nevertheless, the above mentioned attacks can be defended with a valid frame 450 (carrier frame) in which a valid CAN frame is embedded. The reason for this is that the transmitter of the valid frame 450 (carrier frame) is configured to emulate the embedded attack CAN frame only with the resolution of the bit time t_bt2 of the bits of the data phase 452. Sending a frame 450 (carrier frame) whose data field 455 happens to contain a bit sequence that looks like an embedded attack CAN frame (attack CAN frame) may also happen randomly. Thus, the check by the tamper check module 15, 25, 35 protects against intentionally (attack) and unintentionally sent carrier frames.

Otherwise, the modules 15, 25, 35 are constructed in the same way as described above for the first exemplary embodiment.

According to a third exemplary embodiment, the tamper check module 15 has only one counter, i.e., either the first counter 1511 or the second counter 1512. In this case, the value N=1 is chosen as the upper limit for the count value Z1 or Z2 at which the tamper check module 15 decides that the frame 450 that is currently being received has a format error and is therefore to be discarded. In this case, the first evaluation block 151 already returns a dominant bit after a synchronization edge.

The choice N=1 is therefore very advantageous since only one counter has to be implemented, which counts either the number of synchronization edges (falling edge) or the number of consecutive dominant time quanta TQ1 to TQ8. In addition, a counter which only counts from 0 to 1 is very simple and cost-effective to implement.

Otherwise, the modules 15, 35 are constructed in the same way as described above for the first exemplary embodiment.

According to a fourth exemplary embodiment, the device 11, in particular the tamper check module 15, is configured to also use the above-described evaluation of a frame 450 that is currently being received, during the reintegration of the subscriber station 10 into an ongoing communication on the bus 40. Such a reintegration is required if the subscriber station 10 is restarted or is woken up again after an idle phase. In CAN XL communication in a special mode where error signaling has been switched off by configuration in the subscriber station, reintegration is even used after each detected reception error.

In this case, the device 11, in particular the tamper check module 15, uses the blocks 151, 152 to evaluate whether it detects 11 recessive bits in sequence on the CAN bus 40. If such a sequence of bits is detected, the device 11, in particular the tamper check module 15, evaluates this as an idle condition of the bus. Thus, the bus 40 is free and the device 11 can itself start transmitting messages 45, 46 to the bus 40.

In this way, any ongoing operation of the bus system 1 and of the higher-level technical installation will not be disrupted. As a result, the function for preventing manipulation of at least parts of the bus system 1 can also be used to contribute to increasing the data rate in the bus system. In this way, undesirable disturbances and/or a reduction in the performance data of the bus system 1 can be prevented very simply and effectively.

Otherwise, the modules 15, 35 are constructed in the same way as described above for the first or second exemplary embodiment.

According to a fifth exemplary embodiment, at least one of the subscriber stations 10, 30 is designed to generate a frame 450 as a result of a detected manipulation and to send it via the bus 40 in order to inform the other subscriber stations 10, 20, 30 that the frame 450 just or previously sent via the bus 40 was detected as being manipulated.

All above-described embodiments of the subscriber stations 10, 20, 30, of the bus system 1 and the method executed therein can be used individually or in all possible combinations. In particular, all features of the above-described exemplary embodiments and/or their modifications can be combined as desired. Additionally or alternatively, the following modifications are possible in particular.

Even if the present invention is described above using the example of the CAN bus system, the present invention can be used in any communication network and/or communication method in which two different communication phases are used in which the bus states generated for the different communication phases are different. In particular, the present invention can be used in developments of other serial communication networks, such as Ethernet and/or 10BASE-T1S Ethernet, fieldbus systems, etc.

In particular, the bus system 1 according to the exemplary embodiments can be a communication network in which data can be transmitted in series at two different bit rates. It is advantageous, but not necessarily a prerequisite, for an exclusive, collision-free access of a subscriber station 10, 20, 30 to a common channel to be ensured for the bus system 1, at least for certain time periods.

In the exemplary embodiments, the number and arrangement of the subscriber stations 10, 20, 30 in the bus system 1 is arbitrary. In particular, the subscriber station 20 in the bus system 1 can be omitted. It is possible for one or more of the subscriber stations 10 or 30 to be present in the bus system 1. It is possible for all subscriber stations in the bus system 1 to be configured identically, that is to say only subscriber station 10 or only subscriber station 30 are present.

The invention claimed is:

1. A subscriber station for a serial bus system, comprising:
- a communication control device configured to control a communication of the subscriber station with at least one other subscriber station of the bus system and to generate a transmit signal according to a frame;
- a receiving device configured to serially receive at least one signal from a bus of the bus system; and
- a tamper check module configured to check whether at least one predetermined field of a frame which the receiving device created and received from the at least one signal received from the bus has at least one pulse having a second bit value, which is inverse to a predetermined first bit value, in a received bit which has the predetermined first bit value and a predetermined duration, wherein the tamper check module is also configured to discard the received frame after the at least one pulse is present which has the second bit value, which is inverse to the predetermined first bit value;
- wherein the tamper check module has a first counter configured to count a number of falling edges which occur from a beginning of the predetermined field of the received frame to an end of the predetermined field of the received frame.

2. The subscriber station according to claim 1, wherein the tamper check module is configured to check the at least one predetermined field of the received frame in addition to comparing the received frame to a valid frame format for the bus system.

3. The subscriber station according to claim 1, wherein the tamper check module is configured to discard the received frame after a number of the at least one pulse having the second bit value inverse to the predetermined first bit value has exceeded a predetermined upper limit.

4. The subscriber station according to claim 1, wherein the tamper check module has a second counter configured to count a number of a predetermined number of consecutive time quanta which have the inverse bit value and occur from the beginning of the predetermined field of the received frame to the end of the predetermined field of the received frame.

5. The subscriber station according to claim 1, wherein the at least one predetermined field of the received frame includes at least one of the following fields or bits: (i) an acknowledgment delimiter bit (ACK delimiter) in an acknowledgment field of the received frame which follows an acknowledgment bit (ACK slot), (ii) an end field of the received frame, and (iii) an error delimiter of the error frame.

6. The subscriber station according to claim 1, wherein, in a first communication phase, it is negotiated which of subscriber station of the bus system will be given an at least temporarily exclusive, collision-free access to the bus in a subsequent second communication phase.

7. A subscriber station for a serial bus system, comprising:

a communication control device configured to control a communication of the subscriber station with at least one other subscriber station of the bus system and to generate a transmit signal according to a frame;

a receiving device configured to serially receive at least one signal from a bus of the bus system; and a tamper check module configured to check whether at least one predetermined field of a frame which the receiving device created and received from the at least one signal received from the bus has at least one pulse having a second bit value, which is inverse to a predetermined first bit value, in a received bit which has the predetermined first bit value and a predetermined duration, wherein the tamper check module is also configured to discard the received frame after the at least one pulse is present which has the second bit value, which is inverse to the predetermined first bit value;

wherein the tamper check module is configured to check whether, in a received recessive bit having a duration, at least one dominant pulse occurs which has a shorter duration than the received recessive bit.

8. A subscriber station for a serial bus system, comprising:

a communication control device configured to control a communication of the subscriber station with at least one other subscriber station of the bus system and to generate a transmit signal according to a frame;

a receiving device configured to serially receive at least one signal from a bus of the bus system; and a tamper check module configured to check whether at least one predetermined field of a frame which the receiving device created and received from the at least one signal received from the bus has at least one pulse having a second bit value, which is inverse to a predetermined first bit value, in a received bit which has the predetermined first bit value and a predetermined duration, wherein the tamper check module is also configured to discard the received frame after the at least one pulse is present which has the second bit value, which is inverse to the predetermined first bit value;

wherein the tamper check module is configured to check whether, in a bit sequence of at least two received recessive bits each having a duration, at least one dominant pulse occurs which has a shorter duration than the received recessive bit.

9. A subscriber station for a serial bus system, comprising:

a communication control device configured to control a communication of the subscriber station with at least one other subscriber station of the bus system and to generate a transmit signal according to a frame;

a receiving device configured to serially receive at least one signal from a bus of the bus system; and a tamper check module configured to check whether at least one predetermined field of a frame which the receiving device created and received from the at least one signal received from the bus has at least one pulse having a second bit value, which is inverse to a predetermined first bit value, in a received bit which has the predetermined first bit value and a predetermined duration, wherein the tamper check module is also configured to discard the received frame after the at least one pulse is present which has the second bit value, which is inverse to the predetermined first bit value;

wherein the tamper check module has a second counter configured to count a number of time quanta which have the inverse bit value and occur from a beginning of the predetermined field of the received frame to an end of the predetermined field of the received frame.

10. The subscriber station according to claim 9, wherein the tamper check module has a first evaluation block which has the first counter and/or the second counter.

11. The subscriber station according to claim 10, wherein the first evaluation block is a bit timing logic of the communication control device.

12. The subscriber station according to claim 10, wherein:

the tamper check module has a second evaluation block configured to evaluate whether the received frame is to be discarded or not, and the second evaluation block is configured to exchange signals with the first evaluation block for the evaluation of the predetermined field of the received frame.

13. The subscriber station according to claim 12, wherein the second evaluation block is a bit stream processor of the communication control device.

14. A subscriber station for a serial bus system, comprising:

a communication control device configured to control a communication of the subscriber station with at least one other subscriber station of the bus system and to generate a transmit signal according to a frame:

a receiving device configured to serially receive at least one signal from a bus of the bus system; and a tamper check module configured to check whether at least one predetermined field of a frame which the receiving device created and received from the at least one signal received from the bus has at least one pulse having a second bit value, which is inverse to a predetermined first bit value, in a received bit which has the predetermined first bit value and a predetermined duration, wherein the tamper check module is also configured to discard the received frame after the at least one pulse is present which has the second bit value, which is inverse to the predetermined first bit value;

wherein the tamper check module is configured to check for dominant pulses in order to detect on the bus a predetermined idle condition having a predetermined number of bits of the same value, which number cannot otherwise occur in a communication on the bus.

15. A subscriber station for a serial bus system, comprising:

a communication control device configured to control a communication of the subscriber station with at least one other subscriber station of the bus system and to generate a transmit signal according to a frame;

a receiving device configured to serially receive at least one signal from a bus of the bus system; and a tamper check module configured to check whether at least one predetermined field of a frame which the receiving device created and received from the at least one signal received from the bus has at least one pulse having a second bit value, which is inverse to a predetermined first bit value, in a received bit which has the predetermined first bit value and a predetermined duration, wherein the tamper check module is also configured to discard the received frame after the at least one pulse is present which has the second bit value, which is inverse to the predetermined first bit value;

wherein the communication control device is configured to serially generate the transmit signal for transmission to the bus in such a way that, for the frame, a bit time of the transmit signal transmitted to the bus in a first communication phase can differ from a bit time of the transmit signal transmitted in a second communication phase.

16. A bus system, comprising:

a bus; and at least two subscriber stations which are connected to one another via the bus in such a way that they can communicate in series with one another and of which at least one subscriber station is a subscriber station including:

a communication control device configured to control a communication of the subscriber station with at least one other subscriber station of the bus system and to generate a transmit signal according to a frame, a receiving device configured to serially receive at least one signal from a bus of the bus system, and a tamper check module configured to check whether at least one predetermined field of a frame which the receiving device created and received from the at least one signal received from the bus has at least one pulse having a second bit value, which is inverse to a predetermined first bit value, in a received bit which has the predetermined first bit value and a predetermined duration, wherein the tamper check module is also configured to discard the received frame after the at least one pulse is present which has the second bit value, which is inverse to the predetermined first bit value;

wherein the tamper check module has a first counter configured to count a number of falling edges which occur from a beginning of the predetermined field of the received frame to an end of the predetermined field of the received frame.

17. A method for communication in a serial bus system, wherein the method is carried out with using subscriber station of the bus system which has a communication control device, a receiving device, and a tamper check module, wherein the method comprises the following steps:

controlling, using the communication control device, a communication of the subscriber station with at least one other subscriber station of the bus system, wherein the communication control device is configured to generate a transmit signal according to a frame;

serially receiving, using the receiving device, at least one signal from the bus of the bus system; and checking, using the tamper check module, whether at least one predetermined field of a frame which the receiving device created and received from the at least one signal received from the bus has at least one pulse having a second bit value, which is inverse to a predetermined first bit value, in a received bit which has the predetermined first bit value and a predetermined duration, wherein the tamper check module is also configured to discard the received frame after the at least one pulse is present which has the second bit value, which is inverse to the predetermined first bit value;

wherein the tamper check module has a first counter configured to count a number of falling edges which occur from a beginning of the predetermined field of the received frame to an end of the predetermined field of the received frame.

* * * * *